United States Patent
Tiwari

(10) Patent No.: US 9,992,804 B2
(45) Date of Patent: Jun. 5, 2018

(54) DEVICE AND METHOD OF HANDLING NON-ACCESS STRATUM PROCEDURE

(71) Applicant: HTC Corporation, Taoyuan (TW)

(72) Inventor: Kundan Tiwari, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days. days.

(21) Appl. No.: 15/343,197

(22) Filed: Nov. 3, 2016

(65) Prior Publication Data

US 2017/0127461 A1 May 4, 2017

Related U.S. Application Data

(60) Provisional application No. 62/251,044, filed on Nov. 4, 2015.

(51) Int. Cl.
| | |
|---|---|
| *H04W 76/11* | (2018.01) |
| *H04W 76/02* | (2009.01) |
| *H04W 88/02* | (2009.01) |

(52) U.S. Cl.
CPC .......... *H04W 76/021* (2013.01); *H04W 76/11* (2018.02); *H04W 76/18* (2018.02); *H04W 76/12* (2018.02); *H04W 88/02* (2013.01)

(58) Field of Classification Search
CPC . H04W 76/021; H04W 88/02; H04W 76/027; H04W 28/0289; H04W 76/022; H04W 76/11; H04W 76/12; H04W 76/18
See application file for complete search history.

(56) References Cited

U.S. PATENT DOCUMENTS

| | | |
|---|---|---|
| 2012/0275312 A1 | 11/2012 | Cormier |
| 2012/0275401 A1 | 11/2012 | Sun |

FOREIGN PATENT DOCUMENTS

EP 2 472 986 A1 7/2012

OTHER PUBLICATIONS

3GPP TS 24.008 V13.3.0 (Sep. 2015) Technical Specification 3rd Generation Partnership Project; Technical Specification Group Core Network and Terminals; Mobile radio interface Layer 3 specification; Core network protocols; Stage 3 (Release 13).
3GPP TS 24.301 V13.3.0 (Sep. 2015) Technical Specification 3rd Generation Partnership Project; Technical Specification Group Core Network and Terminals; Non-Access-Stratum (NAS) protocol for Evolved Packet System (EPS); Stage 3 (Release 13).
Search Report dated Mar. 1, 2017 for EP application No. 16197066. 0, pp. 1-13.

(Continued)

*Primary Examiner* — Marcos Torres
(74) *Attorney, Agent, or Firm* — Winston Hsu

(57) ABSTRACT

A communication device for handling a Non-Access Stratum (NAS) procedure comprises instructions of transmitting a first session management (SM) message related to an access point name (APN) to a network; receiving a second SM message comprising a SM cause of insufficient resources and a back off timer value of a back off timer indicating that the back off timer is deactivated from the network in response to the transmission the first SM message; being forbidden to transmit a third SM message for the APN to the network, when the back off timer is deactivated for the APN; receiving a fourth SM message from the network indicating to deactivate and to reactivate an activated SM context associated with the APN, when the back off timer is deactivated for the APN; and transmitting a fifth SM message related to the APN to the network.

3 Claims, 3 Drawing Sheets

(56) References Cited

OTHER PUBLICATIONS

3GPP TS 24.008 V13.3.0 (Sep. 2015), "3rd Generation Partnership Project; Technical Specification Group Core Network and Terminals; Mobile radio interface Layer 3 specification; Core network protocols; Stage 3 (Release 13)", XP051018093, pp. 1-727.
3GPP TS 24.301 V13.3.0 (Sep. 2015), "3rd Generation Partnership Project; Technical Specification Group Core Network and Terminals; Non-Access-Stratum (NAS) protocol for Evolved Packet System (EPS); Stage 3 (Release 13)", XP051018090, pp. 1-393.
Office Action dated Oct. 19, 2017 for the Taiwan application No. 105136018, filing date Nov. 4, 2016, pp. 1-16.

DEVICE AND METHOD OF HANDLING NON-ACCESS STRATUM PROCEDURE

CROSS REFERENCE TO RELATED APPLICATIONS

This application claims the benefit of U.S. Provisional Application No. 62/251,044 filed on Nov. 4, 2015, which is incorporated herein by reference.

BACKGROUND OF THE INVENTION

1. Field of the Invention

The present invention relates to a device and a method used in a wireless communication system, and more particularly, to a device and a method of handling a Non-Access Stratum procedure.

2. Description of the Prior Art

A long-term evolution (LTE) system provides high data rate, low latency, packet optimization, and improved system capacity and coverage. In the LTE system, a radio access network known as an evolved universal terrestrial radio access network (E-UTRAN) includes at least one evolved Node-B (eNB) for communicating with at least one user equipment (UE), and for communicating with a core network including a mobility management entity (MME), a serving gateway, etc., for Non-Access Stratum (NAS) control.

The LTE system continues to be evolved to increase peak data rate and throughput by using advanced techniques, such as carrier aggregation (CA), dual connectivity (DC), licensed-assisted access, etc.

According to the prior art, a UE is not allowed to perform a NAS procedure in certain situations, such as transmission of a packet data protocol (PDP) context message for initiating a PDP context activation or for initiating a packet data network (PDN) connection (e.g., IPv6 PDN connection), even if a network (e.g., eNB) is not in congestion. Accordingly, the UE is not able to receive service(s) from the network. Thus, how to handle the NAS procedure for these situations is an important problem to be solved.

SUMMARY OF THE INVENTION

The present invention therefore provides a communication device and method for handling a Non-Access Stratum procedure.

A communication device for handling a Non-Access Stratum (NAS) procedure comprises a storage unit for storing instructions and a processing circuit coupled to the storage unit. The processing circuit is configured to execute the instructions stored in the storage unit. The instructions comprise transmitting a first session management (SM) message related to an access point name (APN) to a network; receiving a second SM message comprising a SM cause of insufficient resources and a back off timer value of a back off timer indicating that the back off timer is deactivated from the network in response to the transmission the first SM message; being forbidden to transmit a third SM message for the APN to the network, when the back off timer is deactivated for the APN, wherein the third SM message is for activating a SM context associated with the APN or for modifying an activated SM context associated with the APN; receiving a fourth SM message from the network indicating to deactivate and to reactivate an activated SM context associated with the APN, when the back off timer is deactivated for the APN; and transmitting a fifth SM message related to the APN to the network in response to the reception of the fourth SM message.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
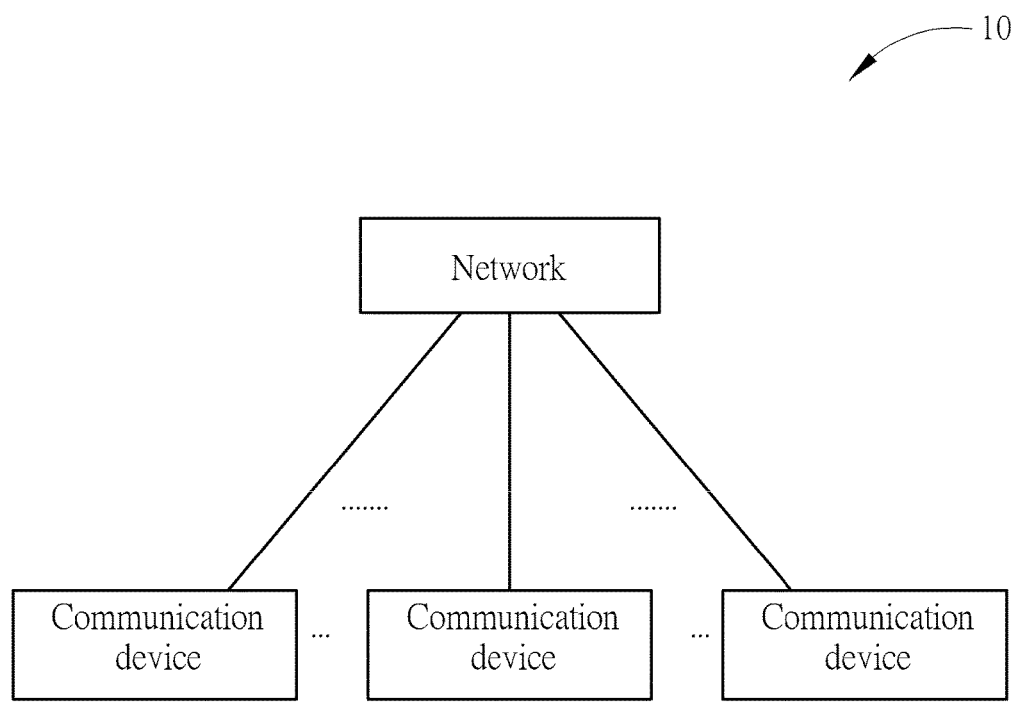
FIG. 1 is a schematic diagram of a wireless communication system according to an example of the present invention.

FIG. 1 is a schematic diagram of a wireless communication system 10 according to an example of the present invention. The wireless communication system 10 is briefly composed of a network and a plurality of communication devices. The network and a communication device may communicate with each other via one or more carriers of licensed band(s) and/or unlicensed band(s). The network and the communication device may simultaneously communicate with each other via multiple cells (e.g., multiple carriers) including a primary cell (PCell) and one or more secondary cells (SCells). The abovementioned cells may be operated in the same or different frame structure types, or in the same or different duplexing modes, i.e. frequency-division duplexing (FDD) and time-division duplexing (TDD). For example, the PCell may be operated on a licensed carrier, while the SCell may be operated on an unlicensed carrier.

In FIG. 1, the network and the communication devices are simply utilized for illustrating the structure of the wireless communication system 10. Practically, the network may be a narrowband (NB) internet of things (IoT) network or an evolved universal terrestrial radio access network (E-UTRAN) including at least one evolved Node-B (eNB). The network may be a fifth generation (5G) network including at least one 5G base station (BS) which employs orthogonal frequency-division multiplexing (OFDM) and/or non-OFDM and a transmission time interval (TTI) shorter than 1 ms (e.g. 100 or 200 microseconds), to communicate with the communication devices. In general, a BS may also be used to refer any of the eNB and the 5G BS.

Furthermore, the network may also include the GERAN/UTRAN/E-UTRAN and a core network, wherein the core network may include network entities such as Mobility Management Entity (MME), Serving Gateway (S-GW), Packet Data Network (PDN) Gateway (P-GW), Self-Organizing Networks (SON) server and/or Radio Network Controller (RNC), etc. The GERAN is an abbreviation of Global System for Mobile Communications (GSM) Enhanced Data rates for GSM Evolution (EDGE) Radio Access Network. In other words, after the network receives information transmitted by a communication device, the information may be processed only by the UTRAN/E-UTRAN and decisions corresponding to the information are made at the UTRAN/E-UTRAN. Alternatively, the UTRAN/E-UTRAN may forward the information to the core network, and the decisions corresponding to the information are made at the core network after the core network processes the information. In addition, the information may be processed by both the UTRAN/E-UTRAN and the core network, and the decisions are made after coordination and/or cooperation are performed by the UTRAN/E-UTRAN and the core network.

A communication device may be a user equipment (UE), a machine type communication (MTC) device, a mobile phone, a laptop, a tablet computer, an electronic book, a portable computer system, a vehicle, an aircraft. In addition, the network and the communication device can be seen as a transmitter or a receiver according to direction (i.e., transmission direction), e.g., for an uplink (UL), the communication device is the transmitter and the network is the receiver, and for a downlink (DL), the network is the transmitter and the communication device is the receiver.

Figure 2:
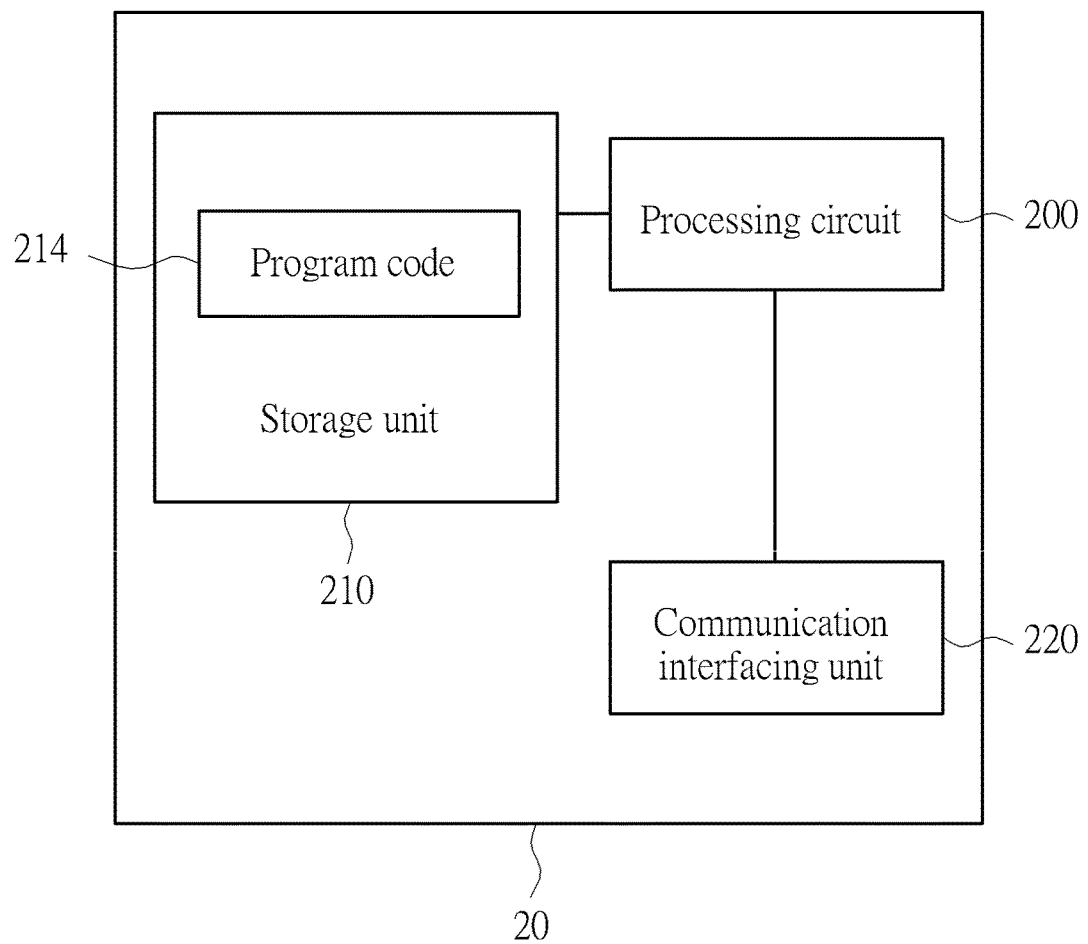
FIG. 2 is a schematic diagram of a communication device according to an example of the present invention.

FIG. 2 is a schematic diagram of a communication device 20 according to an example of the present invention. The communication device 20 may be a communication device or the network shown in FIG. 1, but is not limited herein. The communication device 20 may include a processing circuit 200 such as a microprocessor or Application Specific Integrated Circuit (ASIC), a storage unit 210 and a communication interfacing unit 220. The storage unit 210 may be any data storage device that may store a program code 214, accessed and executed by the processing circuit 200. Examples of the storage unit 210 include but are not limited to a subscriber identity module (SIM), read-only memory (ROM), flash memory, random-access memory (RAM), hard disk, optical data storage device, non-volatile storage unit, non-transitory computer-readable medium (e.g., tangible media), etc. The communication interfacing unit 220 is preferably a transceiver and is used to transmit and receive signals (e.g., data, messages and/or packets) according to processing results of the processing circuit 200.

In the following embodiments, a UE is used to represent a communication device in FIG. 1, to simplify the illustration of the embodiments.

Figure 3:
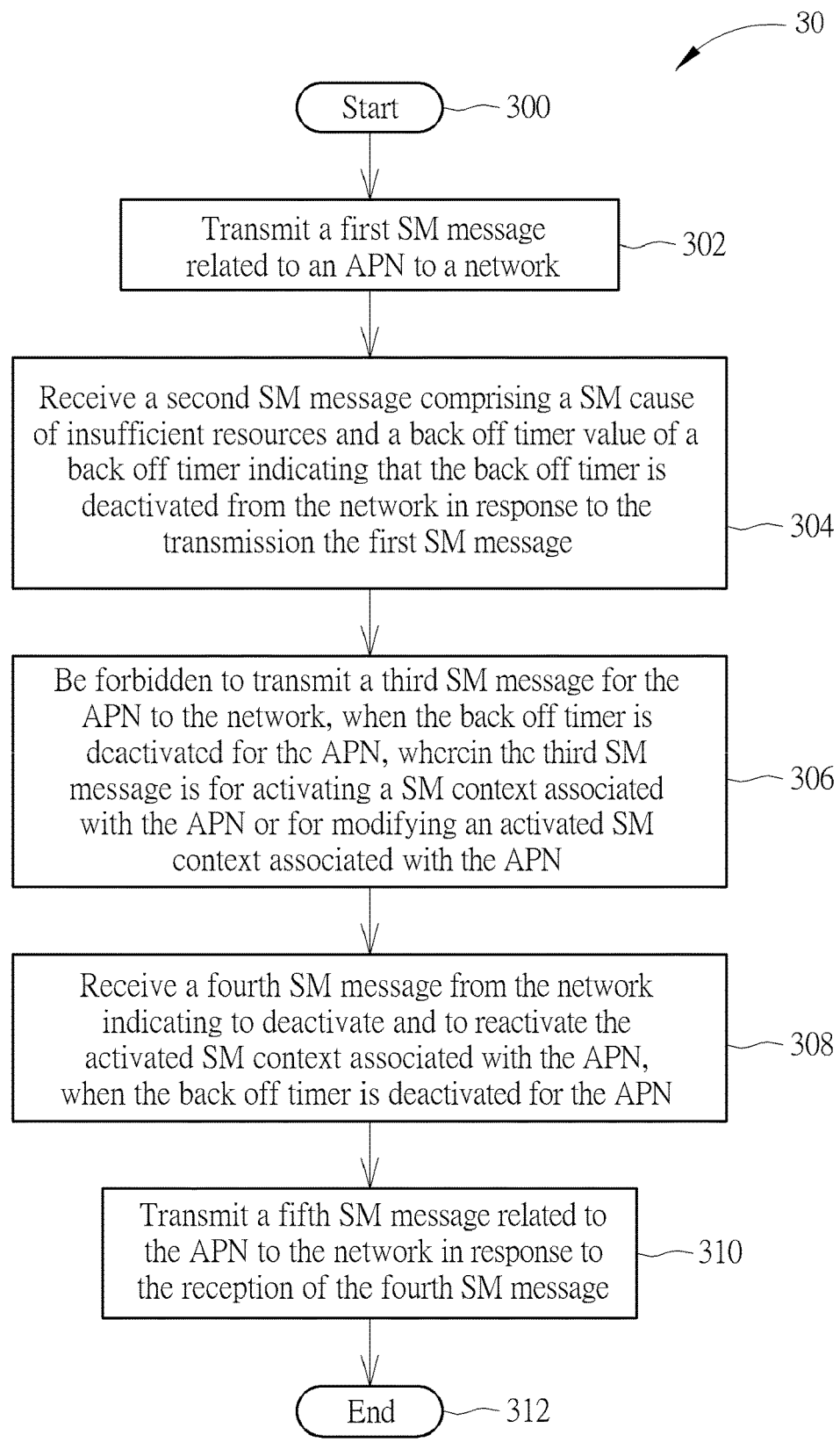
FIG. 3 is a flowchart of a process according to an example of the present invention.

FIG. 3 is a flowchart of a process 30 according to an example of the present invention. The process 30 may be utilized in a UE, for handling a Non-Access Stratum (NAS) procedure. The process 30 may be compiled into the program code 214 and includes the following steps:

Step 300: Start.

Step 302: Transmit a first session management (SM) message related to an access point name (APN) to a network.

Step 304: Receive a second SM message comprising a SM cause of insufficient resources and a back off timer value of a back off timer indicating that the back off timer is deactivated from the network in response to the transmission the first SM message.

Step 306: Be forbidden to transmit a third SM message for the APN to the network, when the back off timer is deactivated for the APN, wherein the third SM message is for activating a SM context associated with the APN or for modifying an activated SM context associated with the APN.

Step 308: Receive a fourth SM message from the network indicating to deactivate and to reactivate the activated SM context associated with the APN, when the back off timer is deactivated for the APN.

Step 310: Transmit a fifth SM message related to the APN to the network in response to the reception of the fourth SM message.

Step 308: End.

According to the process 30, the UE may transmit a first SM message related to an APN to a network. Then, the UE may receive a second SM message comprising a SM cause of insufficient resources and a back off timer value of a back off timer indicating that the back off timer is deactivated from the network in response to the transmission the first SM message. After receiving the second SM message, the UE may be forbidden to transmit a third SM message for the APN to the network, when the back off timer is deactivated for the APN, wherein the third SM message is for activating a SM context associated with the APN or for modifying an activated SM context associated with the APN. The UE may receive a fourth SM message from the network indicating to deactivate and to reactivate the activated SM context associated with the APN, when the back off timer is deactivated for the APN. In one example, the fourth SM message may be a DEACTIVATE packet data protocol (PDP) CONTEXT REQUEST message with a SM cause #39 "reactivation requested" for an activated PDP context of the APN in a GERAN/UTRAN system. In one example, the fourth SM message may be a DEACTIVATE EPS BEARER CONTEXT REQUEST message with an evolved packet system (EPS) SM (ESM) cause #39 "reactivation requested" for an activated EPS bearer context for the APN in an E-UTRAN system Accordingly, the UE may transmit a fifth SM message related to the APN to the network in response to the reception of the fourth SM message.

The process 30 may be applied to a scenario where an APN is not provided by the UE in SM messages. A SM context may be a PDP context or an EPS bearer context. According to the process 30, a UE is allowed to transmit an ACTIVATE PDP CONTEXT REQUEST message, an Activate Secondary PDP Context Request message or a Modify PDP context request in response to reception of a DEACTIVATE PDP CONTEXT REQUEST message including a cause #39 "reactivation requested", if a back off timer value of a back off timer indicates that the back off timer is deactivated.

Similarly, according to the process 30, a UE is allowed to transmit a PDN CONNECTIVITY REQUEST message, a BEARER RESOURCE MODIFICATION REQUEST message or a BEARER RESOURCE ALLOCATION REQUEST message in response to reception of a DEACTIVATE EPS BEARER CONTEXT REQUEST message including an ESM cause #39 "reactivation requested", if a back off timer value of a back off timer indicates that the back off timer is deactivated.

Thus, a UE is allowed to send a Activate PDP context request message for an APN, when the UE receives a SM cause of no resource available with a back off timer value of the back off timer which indicates that the back off timer is deactivated and the UE receives a deactivate PDP Context Activation with cause value #39 "reactivation requested". It should be noted that the process 30 is also applicable to any new wireless technology, e.g., 5G wireless technology.

Realization of the process 30 is not limited to the above description. The following examples may be applied to the process 30.

In one example, the instruction of transmitting the first SM message related to the APN to the network in the process 30 may include transmitting an Activate PDP context Request message comprising the APN, an Activate Secondary PDP Context Request message related to the APN or a Modify PDP context request message related to the APN in a GERAN/UTRAN system, or may include transmitting a PDN CONNECTIVITY REQUEST message comprising the APN, a BEARER RESOURCE MODIFICATION REQUEST message related to the APN or a BEARER RESOURCE ALLOCATION REQUEST message related to the APN in an E-UTRAN system.

In one example, the instruction of receiving the second SM message comprising the SM cause of the insufficient resources and the back off timer value of the back off timer indicating that the back off timer is deactivated in response to the transmission the first SM message in the process 30 may include receiving an ACTIVATE PDP CONTEXT REJECT message or an ACTIVATE SECONDARY PDP CONTEXT REJECT message or a MODIFY PDP CONTEXT REJECT message with a SM cause value #26 "insufficient resources" and the back off timer value indicating that the back off timer is deactivated in a GERAN/UTRAN system, or may include receiving a PDN CONNECTIVITY REJECT message, a BEARER RESOURCE MODIFICATION REJECT message or a BEARER RESOURCE ALLOCATION REJECT message with an ESM cause value #26 "insufficient resources" and the back off timer value indicating that the back off timer is deactivated in an E-UTRAN system.

In one example, the instruction of being forbidden to transmit the third SM message for the APN, when the back off timer is deactivated for the APN in the process 30 may include not transmitting an Activate PDP Context Request message comprising the APN, an Activate Secondary PDP Context Request message related to the APN or a Modify PDP context request message related to the APN in a GERAN/UTRAN system, or may include not transmitting a PDN CONNECTIVITY REQUEST message comprising the APN, a BEARER RESOURCE MODIFICATION REQUEST message related to the APN or a BEARER RESOURCE ALLOCATION REQUEST message related to the APN in an E-UTRAN system.

In one example, the instruction of transmitting the fifth SM message related to the APN in response to the reception of the fourth SM message in the process 30 may include transmitting an Activate PDP Context Request message comprising the APN, an Activate Secondary PDP Context Request message related to the APN or a Modify PDP context request message related to the APN in a GERAN/UTRAN system, or may include transmitting a PDN CONNECTIVITY REQUEST message comprising the APN, a BEARER RESOURCE MODIFICATION REQUEST message related to the APN or a BEARER RESOURCE ALLOCATION REQUEST message related to the APN in an E-UTRAN system.

According to the above description, an example is illustrated as follows.

1. A UE transmits an ATTACH REQUEST message to a network in a GERAN/UTRAN system.

2. The UE receives an ATTACH ACCEPT message from the network.

3. The UE transmits an ACTIVATE PDP CONTEXT REQUEST message comprising an APN to the network.

4. The UE receives an ACTIVATE PDP CONTEXT ACCEPT message. The UE creates a SM context for the same APN from the network.

5. The UE transmits an Activate Secondary PDP Context Request message related to the same APN to the network.

6. The UE receives an Activate Secondary PDP context activation reject message comprising a SM cause value #26 "no resource available" and a back off timer with a back off timer value indicates that the back off timer is deactivated from the network.

7. The UE does not transmit an Activate PDP Context Request message or an Activate Secondary PDP context reject message with the same APN, until a universal subscriber identity module (USIM)/subscriber identity module (SIM) of the UE is removed or the UE is switched off.

8. The UE receives a DEACTIVATE PDP CONTEXT REQUEST with a SM cause #39 "reactivation requested" for the same APN from the network.

9. The UE transmits an Activate PDP context Request message comprising the same APN to the network.

10. The UE receives an Activate PDP context accept message for the same APN from the network.

Those skilled in the art should readily make combinations, modifications and/or alterations on the abovementioned description and examples. The abovementioned description, steps and/or processes including suggested steps can be realized by means that could be hardware, software, firmware (known as a combination of a hardware device and computer instructions and data that reside as read-only software on the hardware device), an electronic system, or combination thereof. An example of the means may be the communication device 20. Any of the processes above may be compiled into the program code 214.

To sum up, the present invention provides a device and a method for handling a NAS procedure. A UE can transmit a SM message to perform the NAS procedure, to initiate a PDP context activation or to initiate a PDN connection. Thus, the problem in the prior art is solved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A communication device for handling a Non-Access Stratum (NAS) procedure, comprising:
  a storage device; and
  a processing circuit, coupled to the storage device, wherein the storage device stores, and the processing circuit is configured to execute instructions of:
  transmitting a first session management (SM) message related to an access point name (APN) to a network;
  receiving a second SM message from the network in response to the transmission of the first SM message, wherein the second SM message comprises an ACTIVATE packet data protocol (PDP) CONTEXT REJECT message with a SM cause value #26 "insufficient resources" and a back off timer value indicating that a back off timer is deactivated, an ACTIVATE SECONDARY PDP CONTEXT REJECT message with the SM cause value #26 "insufficient resources" and the back off timer value indicating that the back off timer is deactivated or a MODIFY PDP CONTEXT REJECT message with the SM cause value #26 "insufficient resources" and the back off timer value indicating that the back off timer is deactivated, in a GSM EDGE Radio Access Network (GERAN)/Universal Terrestrial Radio Access Network (UTRAN) system; or a PDN CONNECTIVITY REJECT message with an evolved packet system (EPS) SM (ESM) cause value #26 "insufficient resources" and the back off timer value indicating that the back off timer is deactivated, a BEARER RESOURCE MODIFICATION REJECT message with the ESM cause value #26 "insufficient resources" and the back off timer value indicating that the back off timer is deactivated or a BEARER RESOURCE ALLOCATION REJECT message with the ESM cause value #26 "insufficient resources" and the back off timer value indicating that the back off timer is deactivated, in an E-UTRAN system; and not transmitting a third SM message for the APN to the network until the communication device receives a DEACTIVATE PDP CONTEXT REQUEST message with a SM cause #39 "reactivation requested" for an activated PDP context of the APN in the GERAN/UTRAN system, or a DEACTIVATE EPS BEARER CONTEXT REQUEST message with an ESM cause #39 "reactivation requested" for an activated EPS bearer context for the APN in the E-UTRAN system.

2. The communication device of claim 1, wherein the instruction of transmitting the first SM message related to the APN to the network comprises:

transmitting an Activate PDP context Request message comprising the APN, an Activate Secondary PDP Context Request message related to the APN or a Modify PDP context request message related to the APN in the GERAN/UTRAN system; or transmitting a PDN CONNECTIVITY REQUEST message comprising the APN, a BEARER RESOURCE MODIFICATION REQUEST message related to the APN or a BEARER RESOURCE ALLOCATION REQUEST message related to the APN in the E-UTRAN system.

3. The communication device of claim 1, wherein the instruction of not transmitting the third SM message for the APN comprises:

not transmitting an Activate PDP Context Request message comprising the APN, an Activate Secondary PDP Context Request message related to the APN or a Modify PDP context request message related to the APN in the GERAN/UTRAN system; or not transmitting a PDN CONNECTIVITY REQUEST message comprising the APN, a BEARER RESOURCE MODIFICATION REQUEST message related to the APN or a BEARER RESOURCE ALLOCATION REQUEST message related to the APN in the E-UTRAN system.

* * * * *